United States Patent [19]
Raad et al.

[11] Patent Number: 5,978,242
[45] Date of Patent: Nov. 2, 1999

[54] AC/DC CONVERTER

[75] Inventors: Bjorn Raad, Oslo; Arne Eide, Royken; Halvor Landet, Oslo, all of Norway

[73] Assignee: Fieldbus International A/S, Norway

[21] Appl. No.: 08/860,643

[22] PCT Filed: Jan. 29, 1996

[86] PCT No.: PCT/NO96/00017

§ 371 Date: Jul. 29, 1997

§ 102(e) Date: Jul. 29, 1997

[87] PCT Pub. No.: WO96/24191

PCT Pub. Date: Aug. 8, 1996

[30] Foreign Application Priority Data

Feb. 1, 1995 [NO] Norway ..................................... 950365

[51] Int. Cl.⁶ .............................. H02M 5/42; H02M 7/00
[52] U.S. Cl. ............................................... 363/89; 363/125
[58] Field of Search .................. 363/44, 52, 53, 363/84, 89, 125, 126, 127

[56] References Cited

U.S. PATENT DOCUMENTS

| | | | |
|---|---|---|---|
| 3,906,337 | 9/1975 | Depenbrock | 363/21 |
| 4,698,740 | 10/1987 | Rodgers et al. | 363/89 |
| 4,901,217 | 2/1990 | Wilson | 363/126 |
| 4,959,766 | 9/1990 | Jain | 363/48 |
| 5,047,912 | 9/1991 | Pelly | 363/89 |
| 5,181,159 | 1/1993 | Peterson | 363/89 |
| 5,479,336 | 12/1995 | Motoki | 363/89 |
| 5,783,933 | 7/1998 | Bailly | 323/222 |
| 5,886,891 | 3/1999 | Jiang et al. | 363/84 |

*Primary Examiner*—Matthew Nguyen
*Attorney, Agent, or Firm*—Fulbright & Jaworski L.L.P.

[57] ABSTRACT

AC/DC transformer for tapping power from an electric current loop (1) for current supply to a functional unit (2), whereby the current loop (1) conducts an alternating current preferrably having a constant frequency and amplitude for the current supply. The converter has an inductive coupling (4) to the current loop (1) and the latter constitutes a primary winding in the inductive coupling (4). At the secondary side there are provided rectifier means (LR) for DC supply to the functional unit (2), a voltage regulator (SR) for controlling an electronic switch (S), a power coil (L1) and at least one capacitor. The power coil (L1) is located at the AC side of the rectifier means (LR) and a capacitor (C1) is provided in series with the power coil (L1) and together with the latter is adapted to have resonance at a frequency coinciding substantially with the frequency of the current supply. When there is no load on the converter, the switch (S) is substantially closed and in this condition short-circuits the alternating voltage at the secondary side of the inductive coupling.

8 Claims, 2 Drawing Sheets

AC/DC CONVERTER

This application is a 371 of PCT NO/96/00017 filed Jan. 29, 1996.

BACKGROUND OF THE INVENTION

This invention relates to a converter circuit arrangement for transferring power from an electrical two-conductor current loop to a functional unit. The circuit comprises an inductive coupling (transformer) and an AC/DC converter based on the switch mode. More specifically this is here derived from a DC/DC converter of the "Boost Mode" type. The current loop conducts an alternating current of a fixed frequency and amplitude for the power transfer, and signals to and from the functional unit are superimposed on the power transfer current in the current loop.

In the inductive coupling the current loop constitutes a primary winding and a rectifier device is located at the secondary side for DC supply to the functional unit. Moreover there is included a voltage regulator for controlling an electronic switch for operation in switch mode as mentioned, a power coil and at least one capacitor.

The invention has been primarily developed in connection with a so-called fieldbus for interconnecting several functional units, as for example measuring instruments or control units in process control installations, and the like. For example, a current loop bus of the type Current Bus Mode according to IEC 1158-2, can be of interest here. This fieldbus or current loop constitutes a two-conductor line, where functional units connected to it communicate, by means of signals, through this line, at the same time as they are supplied with required power in the form of current supply through the same pair of conductors. In such a current loop bus the functional units are connected in series in the bus. Power for current supply from the bus is tapped over the equivalent impedance introduced by the functional unit concerned, into the two-conductor line. This is fed with a constant alternating current from a central unit. Each of the functional units appears as a series load in the current loop bus, and draws power being proportional to the real part of the series load. In practice the connection of functional units to the current loop is effected inductively by the bus' forming one or more windings at the primary side of a transformer. With such an inductive connection the secondary side of this transformer can be an integrated part of the functional unit concerned.

In addition to the above mentioned power or current supply for the operation of associated functional units, the inductive coupling can also be adapted to provide for signal transfer or communication between the fieldbus and the respective functional units. Such signals are superimposed on the power feed, and in practice will normally have a signal strength lying several decades lower than the current amplitude for power transfer. Accordingly it is very important that the power signal has a sinusoidal shape as closely as possible, so that required filtering at the individual functional units will be simplified. Moreover the load represented by each unit with respect to the current loop bus, should be as linear as possible in order to prevent the functional units from introducing harmonic noise into the fieldbus network. Such noise will be disturbing and detrimental for said signal communication. Harmonic noise components from the power supply part or from non-linearities in the individual functional unit, will be spread into the signal band for communication and thereby reduce the signal-to-noise ratio.

These considerations also apply in the alternative of providing for signal transfer to/from the fieldbus by a separate inductive coupling or transformer.

In fieldbus systems or installations of actual interest to this invention, the feed frequency of the AC supply is substantially higher than the common mains frequency, namely 16 kHz in a specific fieldbus embodiment. The frequencies employed for the above discussed communication or signal transfer, usually are significantly higher than this current supply frequency. As will further appear from the description below, the converter circuits for the functional units comprise an electronic switch, such as a transistor switch, adapted to be controlled at a fixed rate or repetition frequency, which typically can be about 350 kHz. The examples of typical frequencies given here form a part of the background for the particular solutions to be described in the following description.

It is desirable that the voltage drop over each connected functional unit for its current supply, is as low as possible and preferrably an ohmic (resistive) load. Possible imaginary voltage drops occurring, will mean that the feed voltage for the AC supply of the current loop will be unnecessarily high, and the total efficiency of the power or the current supply to the complete fieldbus network will be lower.

With respect to voltage regulators there are various types of known and described configurations, including such which are based on switch mode, with an active breaking of applied current and subsequent transfer of the electric energy from an inductive component (power coil) to the load. In the circuit solution being described in the following, there is employed a particular power circuit configuration for the regulator, being known as a "Boost Mode" configuration (booster). This particular form and related forms of voltage regulator configurations are more closely described for example in the publication "High power factor preregulators for off-line power supplies" by Lloyd H. Dixon, Jr. Unitrode Corporation, published in Unitrode Power Supply Design Seminar 1990. This regulator configuration is intended for use in so-called DC/DC converters where a rectified voltage is converted to another rectified voltage. In the circuit solution concerned, a rectifier function is combined with a regulator function and a "Boost Mode" power circuit is employed in order to implement a conversion from AC to DC.

Other examples of rectifier arrangements which, at least superficially, can be considered to have features resembling parts of the rectifier circuits of interest to this invention, are to be found in Swedish patent publication 452.226 and European patent publication 0387.735. These two examples, however, do not relate to current-fed networks of fieldbus type as referred to above; nor are these known rectifiers designed in consideration of other particular conditions and environments that are associated with the fieldbus or current loop networks, being of interest here. SE 452.226 shows a resonant circuit as a filter at the input of a rectifier circuit, the purpose of this filtering being to apply a specific wave shape to the rectifier bridge. The European patent publication referred to also describes use of a series resonant circuit as a filter, for the purpose of delimiting a reverse current (reverse recovery) from the rectifier circuit.

Moreover, short mention shall here be made of three US patents having a certain, albeit peripheral interest here, in so far as none of them describe booster configurations of the kind discussed above:

U.S. Pat. No. 4,959,766 relates to an AC/DC converter having a tuned circuit at the input. At the beginning of the patent specification it is stated that switch mode represents an uninteresting solution in that connection. The solution described comprises thyristor control whereby a larger or smaller portion of the alternating voltage half period is utilized. The starting point is also different from that of the present invention, since signal transfer is not included, nor does any feeding at a constant current take place.

U.S. Pat. No. 4,698,740 describes an AC/DC converter which is not based on a supply at a constant current either. However, there is described a solution with switch mode, so that this point in the patent specification has a certain similarity to the present invention.

U.S. Pat. No. 3,906,337 relates to a DC/DC converter with a conventional rectifier bridge, i.e. rather remote from the basis of the present invention, as discussed above.

SUMMARY OF THE INVENTION

An advantageous converter circuit arrangement for connecting a functional unit to an electric current loop as referred to above, is obtained according to this invention by means of novel and specific features as more closely defined in the claims.

BRIEF DESCRIPTION OF THE DRAWINGS

The invention and advantages obtained shall be explained more closely in the following description with reference to the drawings, wherein.

DETAILED DESCRIPTION OF THE INVENTION

Figure 1:
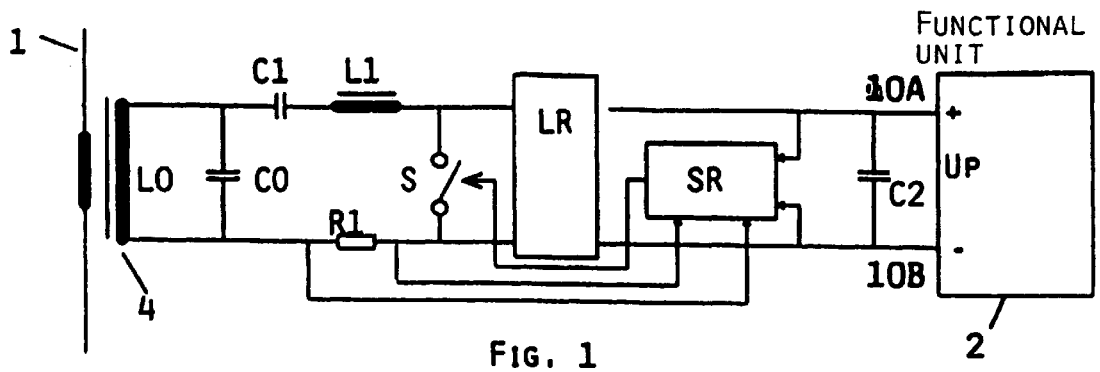
FIG. 1 shows a schematic circuit diagram of a first embodiment of the converter or circuit arrangement according to the invention.

In FIG. 1 conductor 1 represents the fieldbus or current loop which is here shown with an inductive coupling to a converter circuit arrangement, having output terminals 10A–10B for connection of a functional unit 2 to the fieldbus. This circuit thus comprises a transformer 4 with conductor 1 as a primary winding in the form of one or more turns, whereas the secondary winding Lo preferably has a higher number of turns so as to obtain a desired conversion ratio in transformer 4. In parallel to the secondary winding there is shown a capacitor Co. Then follows a series coupling of a capacitor C1 and a power coil L1.

A rectifier device is generally denoted LR. The direct voltage provided by it is applied over terminals 10A and 10B for the required power supply to the functional unit 2, for example a 5 volt DC. In parallel to output terminals 10A–10B there is provided a large capacitor C2 as commonly used.

Figure 2:
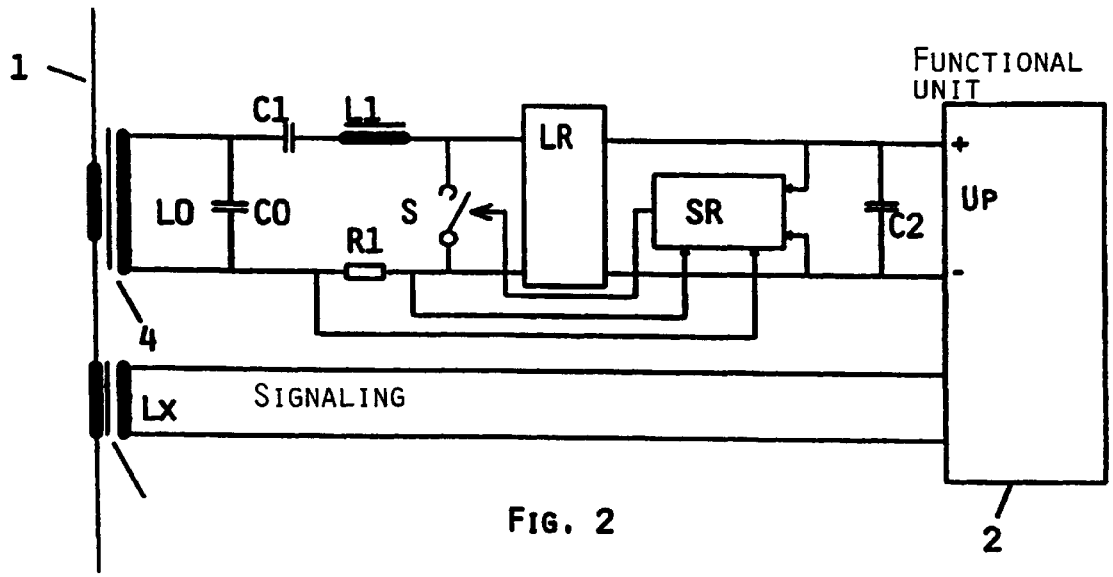
FIG. 2 shows the converter circuit in FIG. 1 and besides a particular signal circuit.

For voltage regulation in a manner known per se, in the rectifier in FIG. 2, there is shown a regulator circuit SR which by means of pulse width modulation controls an electronic circuit breaker or switch S at a suitable rate and time relationship. Accordingly, the DC at the output 10A–10B will be maintained at an approximate constant, desired magnitude, for example 5 volt, at varying loads and possible disturbances in the system, including the current loop 1. As an input to the voltage regulator circuit SR there is shown a connection to a small series resistor R1 for sensing the curve shape or wave form of the alternating current delivered by transformer 4. Besides, the output DC appearing at terminals 10A–10B, is applied to the circuit SR.

The voltage sensed across resistor R1 implies the control of switch S by regulator circuit SR with a pulse width variation being preferrably proportional to the instantaneous value of the current through resistor R1. In order also to take into account a varying load or consumption represented by the power input to functional unit 2, the pulse width is also controlled by the output DC so as to maintain this constant.

The electronic switch S is preferrably controlled at a fixed frequency, but with a varying pulse width. When the switch S opens, the power coil L1 will seek to maintain the current having passed through it, until the energy it has stored is discharged. This current must then flow through the rectifier device LR and will be distributed bet-ween the capacitor C2 and the functional unit 2, which constitutes the useful load.

When the voltage regulator circuit SR controls the operation of switch S with a pulse width modulated control signal, it will be possible to provide for a tapping of electric energy which on average is linear and in-phase over the amplitude of the AC feed signal. In this connection the power coil L1, which together with capacitor Co forms a low pass filter, performs an advantageous and necessary smoothing effect with respect to the switching taking place in switch S, so that the complete rectifier circuit with its load appears as a purely linear circuit to the fieldbus being represented by conductor 1 in FIG. 1.

Capacitor C1 which lies in series with coil L1, together with the latter is adapted to be in resonance at a frequency equal to, or approximately equal to, the feed frequency of the current supply from current loop 1. This means that the series connection of C1 and L1 reflected out to line 1 gives a very low voltage drop at the feed frequency. This is obviously a very important advantage which is obtained with the circuit according to the invention. At higher frequencies than the feed frequency the series circuit of C1 and L1 will be inductive and will stop high frequency switch noise from switch S so that this noise will not be reflected out into current loop 1.

The power coil L1 described acts as a filter for high frequency noise. The circuit arrangement of FIG. 1 with associated components has the property, being particularly important here, that the circuit represents a linear load with respect to current loop 1. If switch S is closed, the voltage across the secondary side of transformer 4 is low and only determined by the resistance in series resonance circuit L1-C1, switch S and series resistor R1. The novel converter circuit being described with reference to FIG. 1 makes possible a design with a small number of components and has an optimal performance when connected to a current loop 1, both with respect to AC power efficiency and low noise contribution to the current loop. Of more specific advantages obtained, the following can be mentioned:

The impedance being transformed into current loop 1 at the feed frequency, is low. The voltage drop in current loop 1 for each functional unit 2 being connected into it, will be correspondingly low and the feed voltage for the current loop as a whole will be minimized to the highest possible degree, depending on the current consumption in the functional units installed.

In connection with the basic diagram of FIG. 1 it is not shown or explained how signaling to and/or from functional unit 2 is effected. Signaling between the fieldbus or current loop 1 and the functional unit 2 according to FIG. 2 takes place by means of a separate inductive coupling or transformer 4X with a secondary side represented by inductance Lx which is connected to functional unit 2. The actual converter circuit arrangement is the same as in FIG. 1 and FIG. 2, as will be seen from these figures.

The secondary side or inductance Lo in FIG. 1 and FIG. 2, together with capacitor Co forms a parallel resonance circuit having a high impedance at the feed frequency, so that a relatively low inductance Lo in coupling transformer 4 does not represent a load on the input of the rectifier/converter. The parallel capacitor Co contributes to the magnetizing of coupling transformer 4 from current loop 1 and provides for the coupler by itself to appear as resistive as seen from current loop 1. With a separate coupling transformer 4X as in the embodiment of FIG. 2, capacitor Co will act as a low impedance (short circuit) with respect to the signaling path over the separate transformer 4X, which obviously is favourable. In this case it is desirable that power coupler 4 will attenuate the communication signals to a minimum degree.

Figure 3:
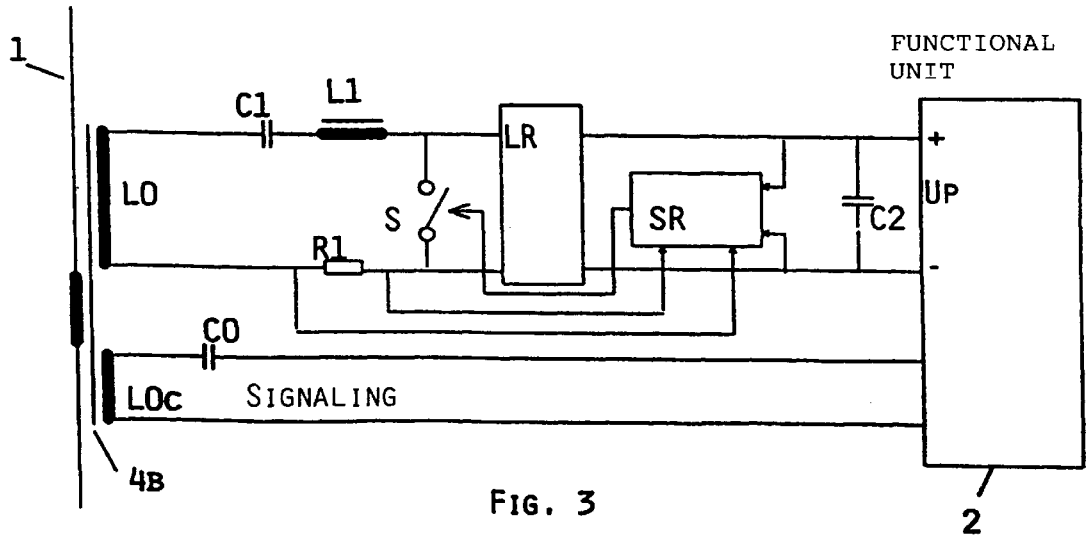
FIG. 3 shows another embodiment of the invention and an associated signal circuit.

In the embodiment of FIG. 3 the same main components will be found in the converter circuit as in FIGS. 1 and 2, but the capacitor Co has been located differently. The signal transfer path in FIG. 3 is modified in relation to the two separate inductor couplings 4 and 4X in FIG. 2, in that signaling in FIG. 3 takes place via a particular winding Loc on the same transformer core 4B as the inductance Lo for the current supply. When signal and power connection in this way take place over the same magnetic core or transformer 4B, a parallel resonance as in FIGS. 1 and 2 between inductance Lo and parallel capacitor Co, would give an unfavourable load in the signaling path. This draw-back is avoided by employing the resonance capacitor Co as a coupling capacitor for the signaling by having it removed to the signaling circuit as shown in FIG. 3. In this case power coil L1 acts as a high-ohmic insulator, since this does not present a load to the signaling circuit. As in FIG. 2 the signaling circuit in FIG. 3 can comprise two drive circuits (not shown) connected to the functional unit 2. Such drive circuits must be very low-ohmic in order that parallel resonance circuit Lo-Co shall be efficient.

Figure 4:
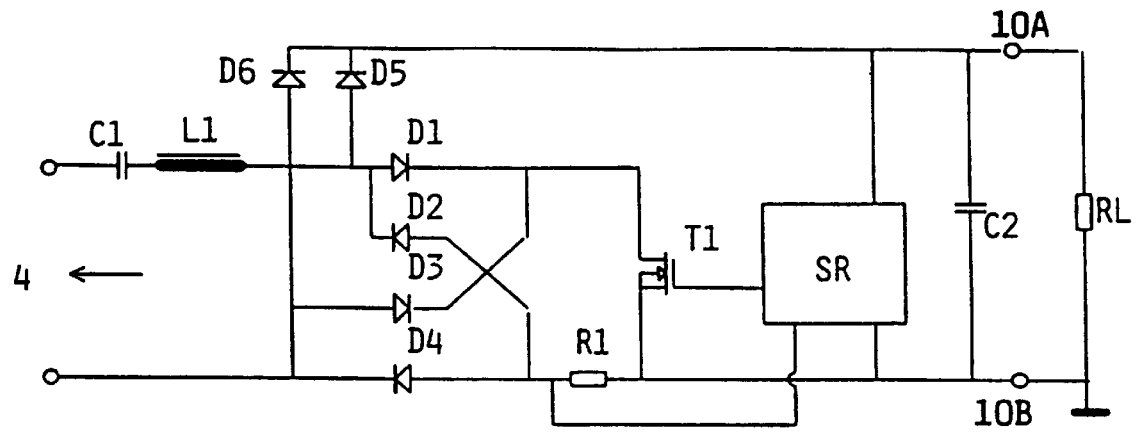
FIG. 4 shows a first practical exemplary embodiment somewhat more in detail, based upon the basic diagram in FIG. 3, but without any signal circuit.

A first, more practical and detailed embodiment as shown in FIG. 4, is based on the basic diagram of FIG. 3, but is simplified in relation to it in so far as the signaling circuit has now not been included. The circuit in FIG. 4 contains the components C1, L1, D1–6, R1 and C2 as well as voltage regulator SR. For simplicity the actual current loop has been omitted in this figure, whereas the connection to transformer 4 has only been indicated with an arrow. At the output side with output terminals 10A and 10B there is here shown a resistor RL representing the functional unit 2 which is shown in FIGS. 1, 2 and 3. Further in FIG. 4 there are inserted two diodes D6 and D7.

In this configuration the rectifier arrangement consists of the diodes D1–D6. Here the electronic switch S is formed by a transistor T1. The bridge circuit D1-D4 serves to secure that the current flows only in one direction through switch T1 so that the current can be broken in both half periods. The switch circuit also makes it possible to read off the sinus curve over resistor R1 in both half periods. This will simplify the implementation of regulator circuit SR. Diode bridge D1-D4 gives a practical implementation of a switch circuit and a circuit for current reading.

By means of voltage regulator SR the off-time of transistor T1 is pulse width modulated at a fixed high frequency (about 350 kHz) so that the off-time is proportional to the instantaneous value of the alternating current measured by means of resistor R1. Besides, the average width of the off-time is controlled so that a constant output voltage is maintained.

As will be realized by experts in the field, the booster configuration discussed at the beginning of this description is represented in FIG. 4 by power coil LK1, switch transistor T1, as well as the diodes D5 and D6 for the main current. A corresponding arrangement is also found in FIG. 5

Figure 5:
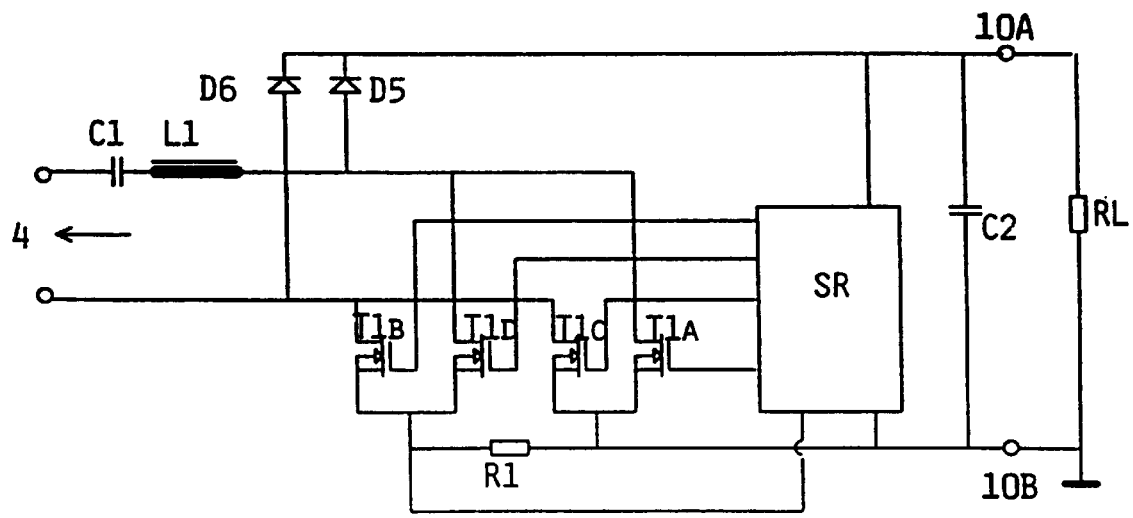
FIG. 5 shows another practical exemplary embodiment being also based on the basic diagram of FIG. 3, and without any signal circuit.

For the purpose of obtaining a design in which as much as possible of the cicuit arrangement described here can be implemented as an integrated circuit, a particularly interesting embodiment is shown in FIG. 5. This is the embodiment of the invention that for the time being is preferred in practice. In this embodiment rectification and switch function are combined in transistors T1a–d. Increased efficiency is obtained because of a lower voltage drop in transistors than in diodes.

The rectifier here consists of the diodes D6 and D5 together with the FET-transistors. In this embodiment the switches consist of the transistors T1a and T1c, these being active each in its half period of the feed current.

The transistors T1a–d are controlled by voltage regulator SR so that T1a conducts together with T1d in one half period of the alternating current (feed current). T1b conducts in the whole half period whereas T1a is pulse width modulated at described above. T1c and T1d operate in a corresponding manner in the other half period of the alternating current.

It is obvious to electronics experts that the circuit arrangements of FIGS. 1–5 as discussed above, are shown much simplified and schematically, and that there will be included, for example drive voltage circuits, operation amplifiers, comparator circuits and so forth, in a more complete practical design, including a design being intended for implementation as an integrated circuit. Some of the essential components, for example the power coil L1, however, may not be incorporated in the integrated circuit. The same applies to transformer 4.

In a short summary the converter or circuit arrangement described here involves advantages with respect to efficiency, negligible introduction of noise into the fieldbus, a minimum use of chokes and transformers, as well as small physical dimensions.

We claim:

1. AC/DC converter for tapping power from an electric current loop for current supply to a functional unit, whereby said current loop conducts an alternating current having a constant frequency and amplitude for said current supply and is adapted to transfer signals to or from the functional unit, whereby the converter has an inductive coupling to said current loop, whereby said current loop constitutes a primary winding in the inductive coupling, and whereby the secondary side comprises rectifier means based on switch mode for DC supply to said functional unit, a voltage regulator for controlling an electronic switch, a power coil and at least one capacitor, wherein said rectifier means comprises
  two diodes for the main current to said DC supply, and
  a rectifier device (T1a,T1d) for providing an input signal to said voltage regulator,
said power coil is located at the AC side of said rectifier means,
a capacitor is inserted in series with said power coil and together with the power coil is adapted to have resonance at a frequency coinciding substantially with the frequency of said current supply, the electronic switch when the converter is not loaded, has a substantially closed position, and in said closed position the electronic switch substantially short-circuits the alternating voltage at the secondary side of said inductive coupling.

2. Converter according to claim 1, wherein said electronic switch is located at the AC side of said rectifier means.

3. Converter according to claim 1 wherein said voltage regulator "(SR)" is adapted to control said electronic switch at a fixed repetition frequency and with pulse width variation.

4. Converter according to claim 1 wherein said electronic switch comprises an active semiconductor component which has a combined rectifier and switching function.

5. Converter according to claim 1, wherein a resonance capacitor is provided over the secondary side of said inductive coupling, said resonance capacitor forming parallel resonance with the inductance of said inductive coupling at the AC frequency.

6. Converter according to claim 1 wherein said inductive coupling also serves for signal transfer between said current loop and said functional unit, a resonance capacitor forms parallel resonance with the inductance of said inductive coupling at the AC frequency, and said capacitor at the same time is a coupling capacitor for said signal transfer.

7. AC/DC converter for tapping power from an electric current loop for current supply to a functional unit, whereby said current loop conducts an alternating current having a constant frequency and amplitude for said current supply and is adapted to transfer signals to or from the functional unit, whereby the converter has an inductive coupling to said current loop, whereby said current loop constitutes a primary winding in the inductive coupling, and whereby the secondary side comprises rectifier means based on switch mode for DC supply to said functional unit, a voltage regulator for controlling an electronic switch, a power coil and at least one capacitor, wherein said rectifier means comprises
two diodes for the main current to said DC supply, and
a rectifier device (T1$a$,T1$d$) for providing an input signal to said voltage regulator, said power coil is located at the AC side of said rectifier means, a capacitor is inserted in series with said power coil and together with the power coil is adapted to have resonance at a frequency coinciding substantially with the frequency of said current supply, the electronic switch when the converter is not loaded, has a substantially closed position, in said closed position the electronic switch is substantially short-circuits the alternating voltage at the secondary side of said inductive coupling, said electronic switch is located at the AC side of said rectifier means, said voltage regulator is adapted to control said electronic switch at a fixed repetition frequency and with pulse width variation, said electronic switch comprises an active semiconductor component which has a combined rectifier and switching function, and a resonance capacitor is provided over the secondary side of said inductive coupling, said resonance capacitor forming parallel resonance with the inductance of said inductive coupling at the AC frequency.

8. AC/DC converter for tapping power from an electric current loop for current supply to a functional unit, whereby said current loop conducts an alternating current having a constant frequency and amplitude for said current supply and is adapted to transfer signals to or from the functional unit, whereby the converter has an inductive coupling to said current loop, whereby said current loop constitutes a primary winding in the inductive coupling, and whereby the secondary side comprises rectifier means based on switch mode for DC supply to said functional unit, a voltage regulator for controlling an electronic switch, a power coil and at least one capacitor, wherein said rectifier means comprises
two diodes for the main current to said DC supply, and
a rectifier device (T1$a$,T1$d$) for providing an input signal to said voltage regulator, said power coil is located at the AC side of said rectifier means, a capacitor is inserted in series with said power coil and together with the power coil is adapted to have resonance at a frequency coinciding substantially with the frequency of said current supply, the electronic switch when the converter is not loaded, has a substantially closed position, in said closed position the electronic switch is substantially short-circuits the alternating voltage at the secondary side of said inductive coupling, said electronic switch is located at the AC side of said rectifier means, said voltage regulator is adapted to control said electronic switch at a fixed repetition frequency and with pulse width variation, said electronic switch comprises an active semiconductor component which has a combined rectifier and switching function, said inductive coupling also serves for signal transfer between said current loop and said functional unit, a resonance capacitor forms parallel resonance with the inductance of said inductive coupling at the AC frequency, and said capacitor at the same time is a coupling capacitor for said signal transfer.

* * * * *